April 22, 1924.

E. R. GREENER

CALCULATOR

Filed March 2, 1922

Inventor
Eugene R. Greener;
By
Attorney

April 22, 1924.

E. R. GREENER

CALCULATOR

Filed March 2 1922

Inventor
Eugene R. Greener,
By
Attorney

April 22, 1924.
E. R. GREENER
CALCULATOR
Filed March 2, 1922   6 Sheets-Sheet 3
1,491,694
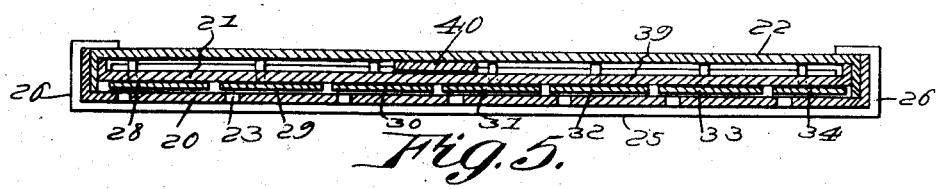
Fig. 5.
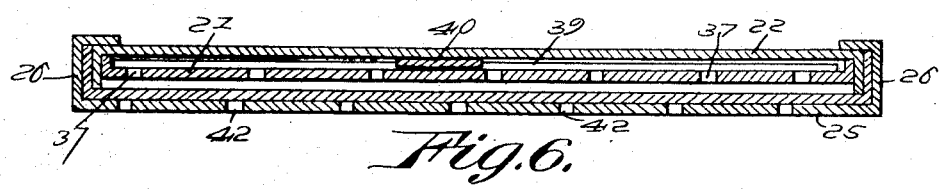
Fig. 6.
Fig. 12.
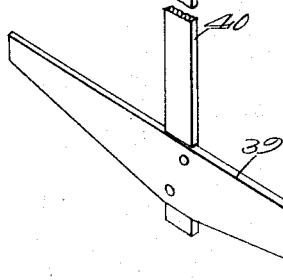
Fig. 13.
Inventor
Eugene R. Greener,
By
E. Hume Talbert
Attorney April 22, 1924.

E. R. GREENER

CALCULATOR

Filed March 2, 1922

Inventor

Eugene R. Greener,

By

Attorney

April 22, 1924.

E. R. GREENER 1,491,694

CALCULATOR

Filed March 2, 1922

Inventor
Eugene R. Greener,

By
Attorney

April 22, 1924.
E. R. GREENER
CALCULATOR
Filed March 2, 1922
1,491,694
6 Sheets-Sheet 6
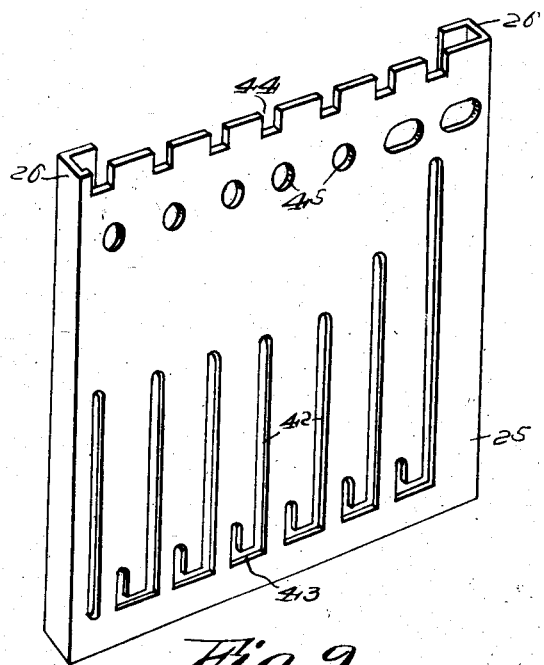
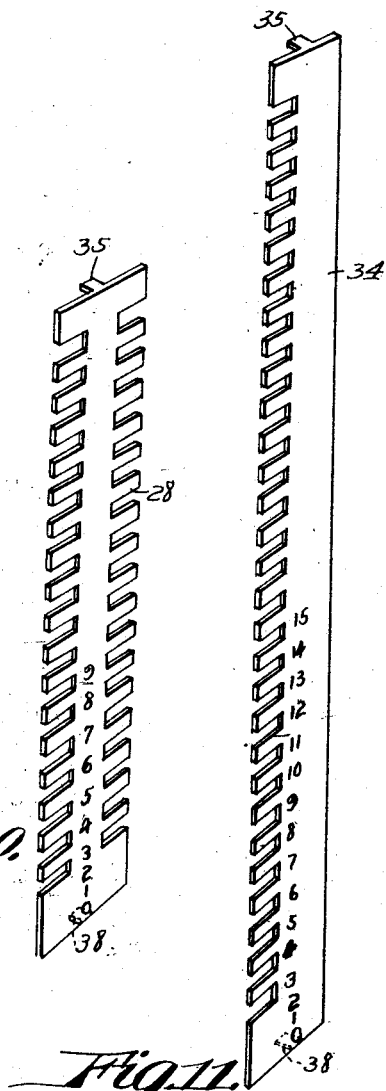
Fig. 9.
Fig. 10.
Fig. 11.
Inventor
Eugene R. Greener,
By
Attorney Patented Apr. 22, 1924.

1,491,694

UNITED STATES PATENT OFFICE.

EUGENE R. GREENER, OF BELLEVUE, PENNSYLVANIA.

CALCULATOR.

Application filed March 2, 1922. Serial No. 540,433.

*To all whom it may concern:*

Be it known that EUGENE R. GREENER, a citizen of Poland, and resident of the United States of America, residing at Bellevue, in the county of Allegheny and State of Pennsylvania, has invented new and useful Improvements in Calculators, of which the following is a specification.

The object of the invention is to provide a simple and durable calculating device suitable for use by architects, builders, estimators and mechanics generally in making additions and subtractions with accuracy and facility without resorting to figuring; and with these objects in view the invention consists in a construction and combination of parts of which a preferred embodiment is shown in the accompanying drawings, wherein:—

Figures 1 and 2 are front views of the apparatus arranged respectively for use in addition and subtraction.

Figures 3 and 4 are longitudinal sectional views taken respectively on the planes indicated by the lines 3—3 and 4—4 of Figures 1 and 2.

Figures 5 and 6 are transverse sectional views taken respectively on the planes indicated by the lines 5—5 and 6—6 of Figure 1.

Figure 8 is a detail view in perspective of the intermediate guide plate.

Figure 9 is a detail view of the slide detached.

Figures 10 and 11 are detail views respectively of one of the single and one of the double rack bars.

Figure 12 is a similar view of the resetting member.

Figure 13 is a view of the actuator or pointer.

Figures 1, 3:
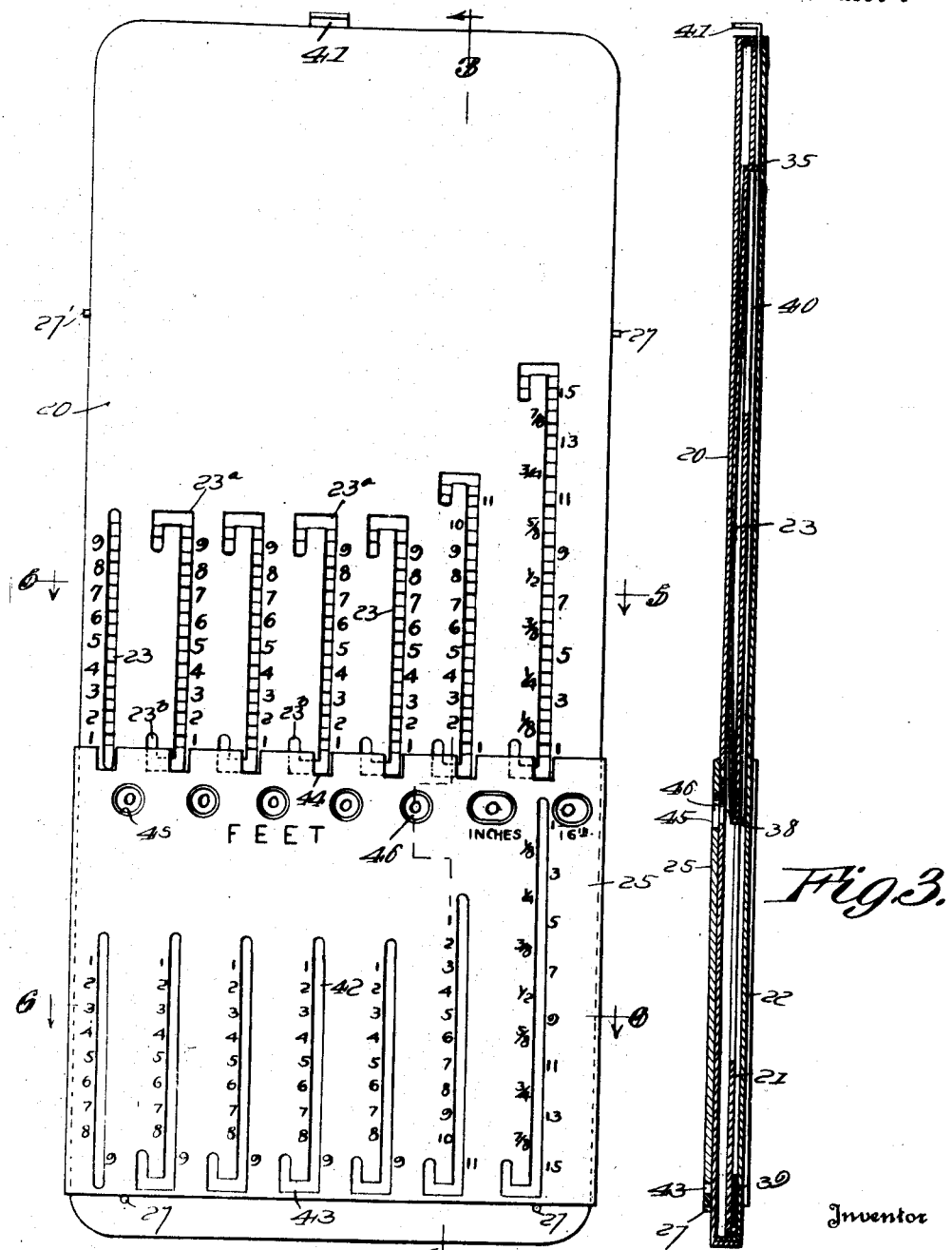

The apparatus in general contour is oblong and flat and in practice may be of a size suitable to be carried in the pocket and of the dimensions approximately of a pocket book or folder, and the same consists essentially of a front plate 20, an intermediate guide plate 21, and a rear plate 22, the edges of which are flanged and secured together by soldering or otherwise to insure the maintenance of their proper relative positions, rack bars fitted for longitudinal sliding movement upon the intermediate or guide plate and actuable through slots 23 in the face plate by means of a pointer or actuator 24 shown in detail in Figure 13, and a slide 25 fitted exteriorly upon the face plate for movement longitudinally thereof and flanged as indicated at 26 to form a guide embracing the edges of the structure represented by the front and rear plates, stop pins 27 being provided in the path of the lower edge of said slide to limit the downward movement thereof.

The device illustrated in the drawing is designed for calculation in reference to numbers up to five integers (or in other words tens of thousands) of feet, for example as represented by the rack bars 28, 29, 30, 31 and 32 inches as represented by the rack bar 33 and fractions (in this instance sixteenths) of an inch by the rack bar 34, each of said bars being provided with terminal rearwardly directed ears 35 for engagement with guide slots 36 and 37 formed in the intermediate or guide plate to determine and direct the path of movement thereof, each of said rack bars being provided at its lower end with a resetting pin 38 and the pins of all of said rack bars being arranged in the path of movement of a cross head 39 of a resetting member 40 of which the shank extends longitudinally of the casing and is provided at the upper end thereof with a finger hold 41 accessible to the operator at the end of the device for movement to return the bars to their normal or neutral position after the completion of a calculation and preparatory to a further calculation.

The rack bars with the exception of the marginal elements thereof represented as at 28 and 34 are provided at opposite sides with parallel series of rack teeth while the marginal bars 28 and 34 are provided at opposite sides with parallel series of rack teeth while the marginal bar 34 which in this embodiment of the invention represent fractions of an inch are provided with only single series of teeth, and these teeth are exposed opposite the slots 23 in the face plate for access as above indicated by the pointer or actuator 24, while adjacent to each indicator slot 23 and on each rack bar are represented series of numerals as guides to the operator in placing the pointer or actuator and in moving the rack bars to represent the numbers to enter into the calculations. The slots 23 in the face plate, with the exception of those relating to the marginal rack bars are provided at their upper ends with return extensions 23ª and at lower ends with return extensions 23ᵇ through which the pointer or actuator may pass in order to shift the engagement thereof from one rack to the next of higher denomination.

Figure 2:
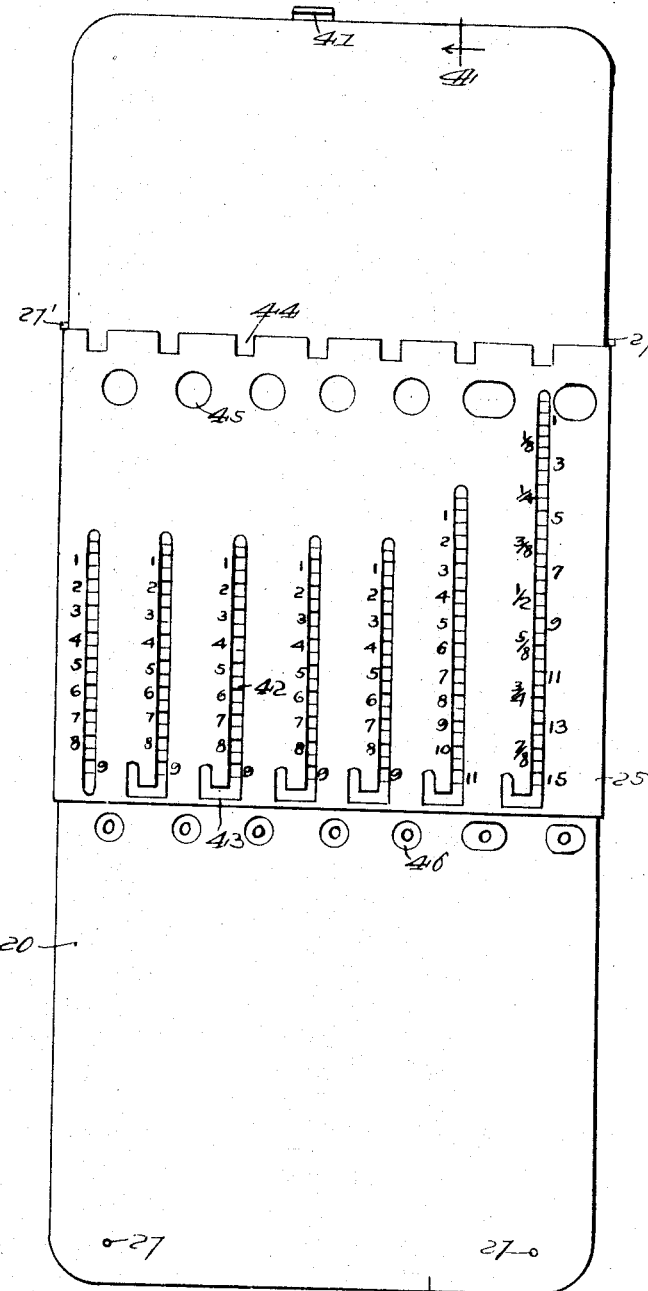
Figure 4:
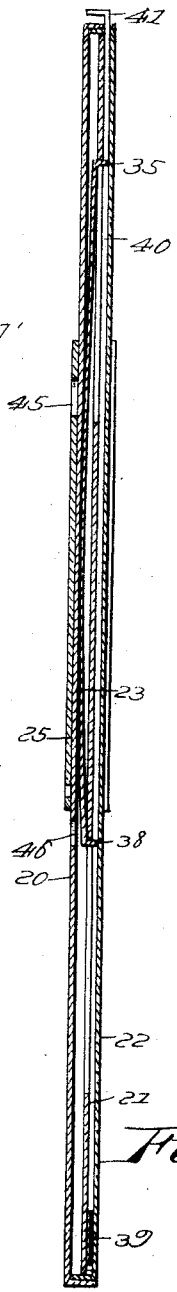
Figure 7:
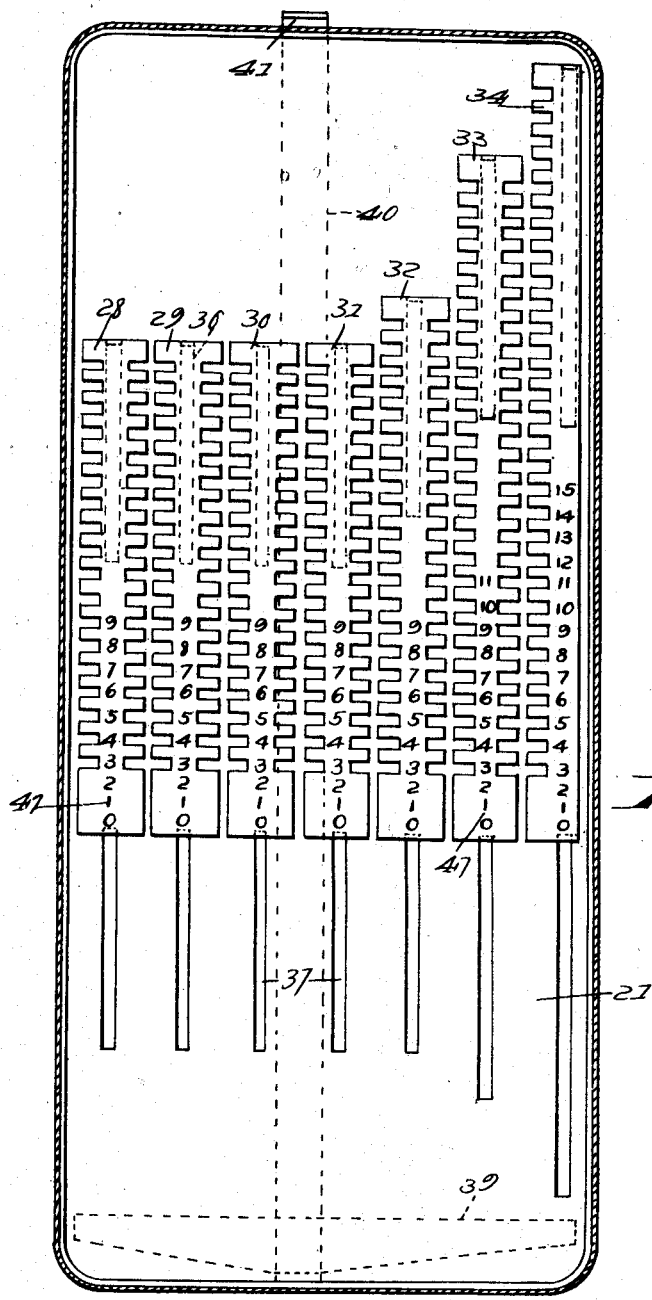
Figure 7 is a front view partly in section with the slide omitted and the front plate removed to show the rack bars.
Figure 5:
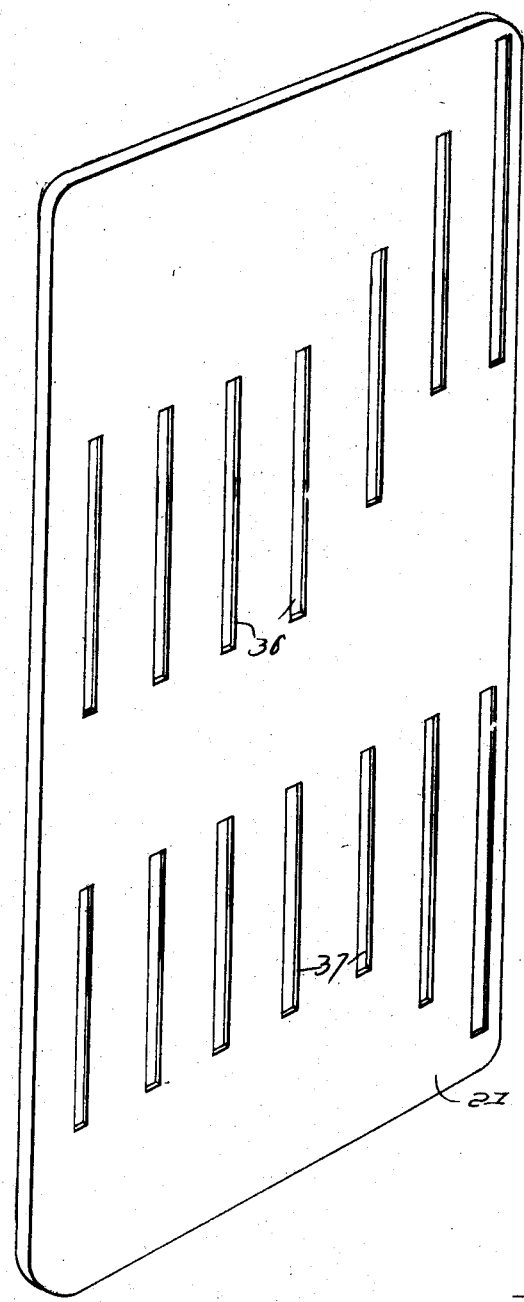

The slide 25, however, is also provided with slots 42 provided at their lower ends with return extensions 43 and while this member is inoperative when in the lowered position indicated in Figure 1, it is adapted when moved to the position indicated in Figure 2 to serve as a guide in making subtractions, and in the latter position the slots thereof register with those of the face plate and permit of the respective movements of the rack bars by the insertion of the pointer or actuator through the slots so registered.

When the slide is in its lowered or inoperative position, notches 44 at the upper edge thereof register with the lower ends of the slots 23 in the face plate and cut out the return extensions 23ᵇ at the lower ends of the slots 23, so as to render said lower return extensions inoperative while permitting the pointer or actuator to move straight to the lower ends of the slots and also to pass into the return extensions at the upper ends of the slots, in the said lowered or inoperative position of the slide openings 45 thereof register with inspection openings 46 which are formed in the face plate and which serve as the means whereby the result of the calculation is displayed, by disclosing those numerals of the several rack bars which represent the result of the calculation which has been made. When the slide is moved to its operative or upper position for use in subtraction the lower edge thereof is raised sufficiently to expose the inspection openings 46 of the face plate, and the return extensions 43 at the lower ends of the slots 42 in the slide register with the return extensions 23ᵇ at the lower ends of the slots 23 in the face plate and thus permit of the use of said return extensions 23ᵇ in subtraction, but the upper ends of the slots 42 in the slide not being provided with return extensions, they serve when the slide is in the raised position to cut off the return extensions 23ª at the upper ends of the slots 23 in the face plate and prevent the use therefore of the last named return extensions which are only employed in addition and which as above indicated are exposed when the slide is in its lowered or inoperative position.

In the operation of the device as for example in addition the pointer or actuator is inserted into the slot of the face plate corresponding with the column or value of the number to be added opposite the numeral corresponding with that number and is moved downward to the end of the slot except where the number thus to be added plus the number which has previously been added in the same column exceeds 10, in which event the stylus is moved upward instead of downward and is carried around the return bend and down to the extremity of the latter to carry the amount over to the next column by moving the rack bar of the next higher denomination. As a guide to the operator in determining whether the movement of the pointer should be upward or downward, there is provided on each rack bar a tens indicator 47 which is visible through the guide slot of the rack bar which is to be operated. If this indicator is above the numeral on the scale at the side of the slot which is to be used in making the addition the pointer is moved downward, whereas if the numeral which the operator desires to add to the sum already reached is above the indicator 47 the pointer must be moved upward and around the return bend to carry the tens to the next column. A mistake in this respect can not be made, however, for the reason that the movement of each rack-bar is limited by the lengths of the slots in the intermediate or guide plate, and should the attempt be made to move the rack bar downward when it should be moved upward, the movement of the pointer will be checked before it reaches the end of the slot by the engagement of one of the guide ears of the rack bar with the end of the corresponding slot 36 or 37 in the guide plate 21.

Obviously in the addition of fractions of an inch and inches the same procedure is followed and therefore, if for example it is desired to make the following addition;

One foot_____3 5/16 inches
Two feet_____4 1/16 inches
Three feet_____6 11/16 inches the procedure will be as follows:

Set the indicators at zero by pulling out the release or resetting bar 40 and push the latter back to its normal position. Place the pointer or actuator in notch five in the sixteenth column and pull down to the bottom of the slot. Set the pointer at the notch one in the sixteenth column and pull down as before, the indicator at the corresponding opening 46 then indicating six sixteenths. Set pointer at eleven in the sixteenth column and it will be observed that it is above the mark or indicator 47 of the rack, so that it is necessary to move the pointer upward instead of downward to the top of the column and over to the inch column through the return extension, and pulling the pointer down to the bottom of the hook. The indicators now read one inch and one sixteenth. Again engage the pointer or stylus in notch three in the inch column and pull down. Set the pointer or stylus at four in the inch column and pull down and the inch column will then register eight inches. Again set the pointer or stylus at six in the inch column and it will be observed that it is above the indicator mark 47 and therefore that it is necessary to push the pointer upward and around the return extension whereupon the indicators will show one foot and two and one sixteenth inches. Then engage the stylus one in the first integer or foot column and pull down to the bottom of the slot, set the pointer at two in the same column and pull down, and again engage the stylus at three and pull down to the bottom of the column whereupon the indicator will show an addition of seven feet two and one sixteenth inches, or the sum of the several amounts indicated in the above example.

In subtraction the operation is similar to that above described with the exception that, as above indicated, with the slide arranged in the operative position the return extensions at the upper ends of the guide slots 23 are closed while those at the lower ends are open and the pointer in operation is moved upward instead of downward except where the indicator mark 47 is above the numeral of the scale which is to be subtracted, in which case the pointer is moved downward and around the return bend or extension to carry the result into the next column of higher denomination and thereby subtract in terms of said higher denomination from the next column.

Having described the invention, what is claimed as new and useful is:—

A machine as indicated including a face plate provided with numerically graduated slots and inspection openings for displaying the result, said face plate having longitudinal flanged edges, a rear plate provided with longitudinal flanged edges engaging within the flanged edges of the face plate and secured thereto to insure the maintenance of the plates in their proper relative positions, an intermediate guide plate with flanged edges engaging between the flanges of the rear plate and provided with longitudinal guide slots, rack bars fitted for longitudinal sliding movement upon the intermediate or guide plate and adapted to be operable through the slots of the face plate, said rack bars being bowed from the intermediate or guide plate toward and frictionally engaging with the inner face of the face plate and being constructed of spring material and provided at their ends with lateral projections held in positions passing through the guide slots of the intermediate or guide plate due to friction on the face plate, and a resetting member between the intermediate or guide plate and the rear plate and provided with transverse means located below certain of the projections of the rack bars for effecting a resetting of the rack bars.

In testimony whereof he affixes his signature.

EUGENE R. GREENER.